(12) United States Patent　　　　(10) Patent No.:　US 12,688,216 B2
Orellana et al.　　　　　　　　　　　(45) Date of Patent:　　Jul. 21, 2026

(54) INFORMATION PROCESSING SYSTEM AND METHOD FOR PROCESSING INFORMATION

(71) Applicant: RAKUTEN GROUP, INC., Tokyo (JP)

(72) Inventors: Luis Orellana, Tokyo (JP); Mimpei Morishita, Tokyo (JP); Michael Eng, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 155 days.

(21) Appl. No.: 18/734,582

(22) Filed: Jun. 5, 2024

(65) Prior Publication Data

US 2025/0245256 A1　　Jul. 31, 2025

(30) Foreign Application Priority Data

Jan. 25, 2024　(JP) ................................. 2024-009522

(51) Int. Cl.
　G06F 40/30　　　　(2020.01)
　G06F 16/3329　　　(2025.01)
　　　　　　　(Continued)

(52) U.S. Cl.
　CPC ...... G06F 16/3347 (2019.01); G06F 16/3329 (2019.01); G06F 16/35 (2019.01); G06F 40/40 (2020.01)

(58) Field of Classification Search
　CPC .... G06F 40/211; G06F 40/253; G06F 40/268; G06F 40/284; G06F 40/30; G06F 40/55; G06F 40/58; G06F 40/263; G06F 16/3347; G06F 16/35; G06F 16/3329;

G06F 40/40; G10L 15/16; G10L 19/005; G10L 19/00; G10L 25/27; G10L 25/30; G10L 15/02; G10L 15/063; G10L 15/12; G10L 15/07; G10L 15/20; G10L 15/22; G10L 15/26;

(Continued)

(56)　　　　　References Cited

U.S. PATENT DOCUMENTS

| 11,113,324 | B2 * | 9/2021 | Winzenried | ........... G06F 16/353 |
| 11,842,171 | B2 * | 12/2023 | Kedida | .................... G06F 8/30 |

(Continued)

FOREIGN PATENT DOCUMENTS

| JP | 7313757 B1 | 7/2023 |

*Primary Examiner* — Vu B Hang

(74) *Attorney, Agent, or Firm* — Sughrue Mion, PLLC

(57)　　　　　ABSTRACT

A method for processing information is executed by one or more computers. The method includes obtaining a user classification item related to a question, the user classification item being any of user classification items based on user classification, the user classification corresponding to content classification; converting the question into a question vector; searching document vectors assigned with a content classification item that corresponds to the user classification item related to the question vector for a specified number of the document vectors having a high degree of relevance to the question vector; generating a prompt for input to a large language model, the prompt including content of the specified number of the document vectors prior to conversion, serving as context, and the question; inputting the prompt to the large language model; and outputting the answer generated based on text output by the large language model.

8 Claims, 4 Drawing Sheets

(51) Int. Cl.
*G06F 16/334* (2025.01)
*G06F 16/35* (2019.01)
*G06F 40/40* (2020.01)

(58) Field of Classification Search
CPC ..... G10L 15/30; G10L 15/08; G10L 15/1822;
G10L 15/183; G10L 15/193; G10L 15/19;
G10L 15/1815; G10L 17/18
See application file for complete search history.

(56) References Cited

U.S. PATENT DOCUMENTS

2024/0346255 A1 * 10/2024 Blohm ..................... G06F 40/30
2024/0346256 A1 * 10/2024 Qin ....................... G06F 40/216

* cited by examiner

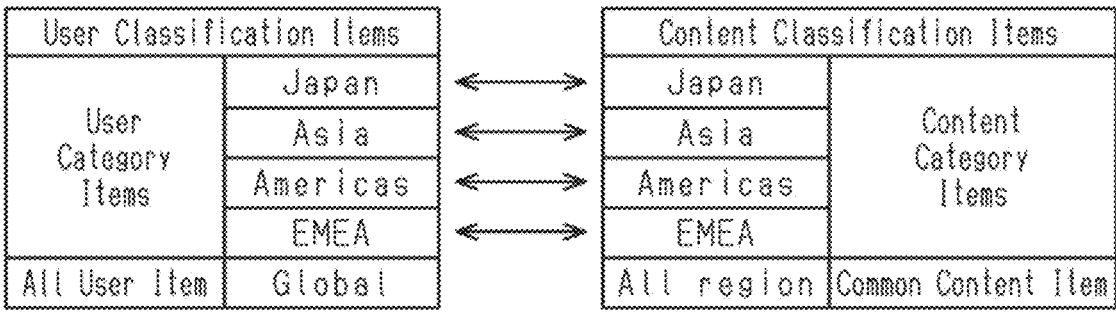

| User Classification Items | | Content Classification Items | |
|---|---|---|---|
| User Category Items | Japan | Japan | Content Category Items |
| | Asia | Asia | |
| | Americas | Americas | |
| | EMEA | EMEA | |
| All User Item | Global | All region | Common Content Item |

Fig.3

- 30
- 34 — Electronic Document
- 35 — Metadata

- 20 (20A)
  - Content Acquisition Unit — 51
  - Metadata Management Unit — 52
  - Content Splitter — 53
  - Vector Converter — 54
  - Data Management Unit — 55

- 13 — Vector DB

- 40
- 15

- 20 (20B)
  - User Classification Acquisition Unit — 61
  - Question Acquisition Unit — 62
  - Vector Converter — 63
  - Vector Search Unit — 64
  - Prompt Generation Unit — 65
  - Prompt Input Unit — 66
  - Answer Acquisition Unit — 67
  - Answer Output Unit — 68

- 45 — Prompt
- 14 — LLM
- 46 — Completion

Fig.5

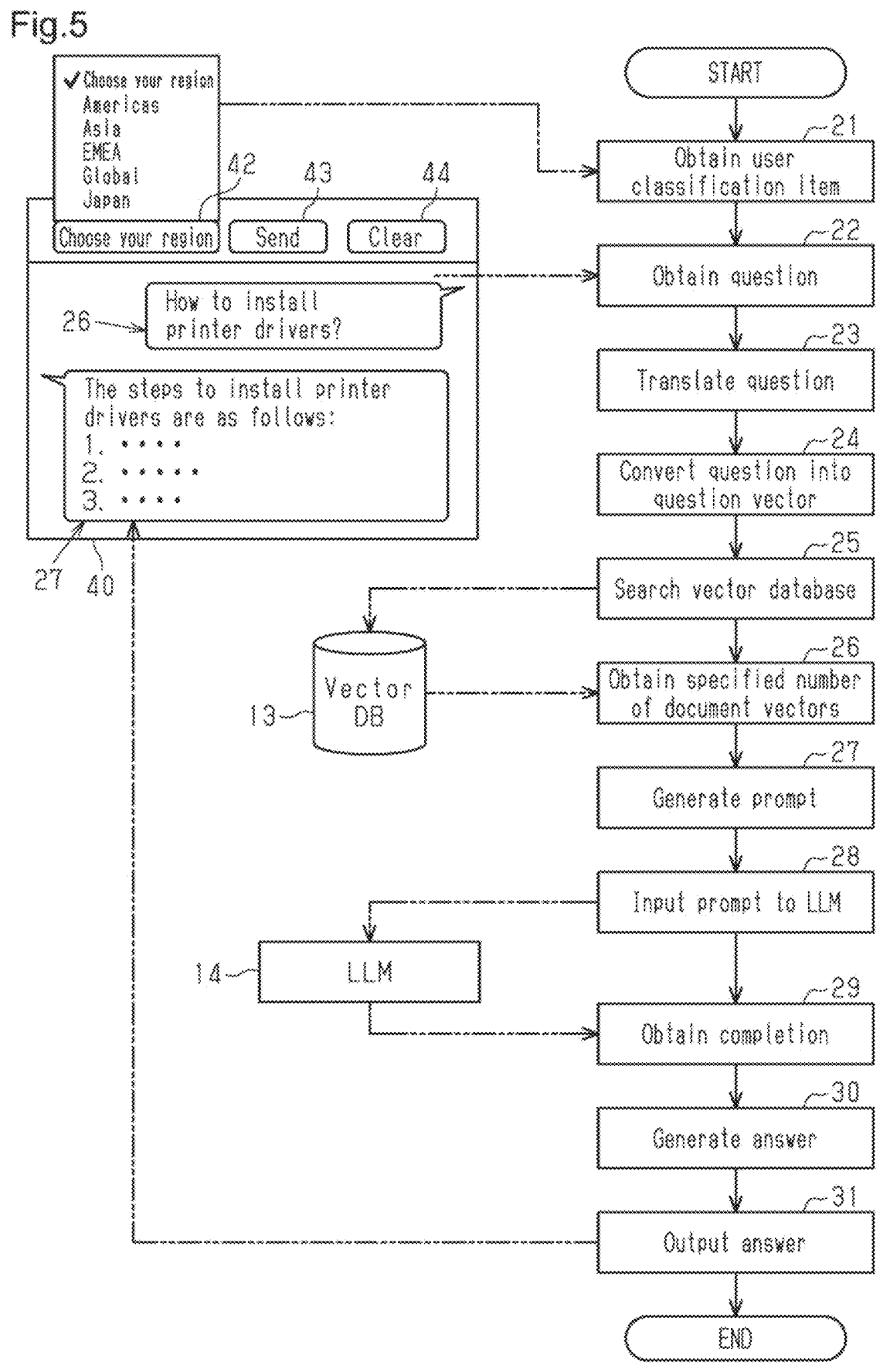

Choose your region
Americas
Asia
EMEA
Global
Japan

| Choose your region | Send | Clear |

26 — How to install printer drivers?

The steps to install printer drivers are as follows:
1. ‥‥
2. ‥‥
3. ‥‥

27  40

13 — Vector DB

14 — LLM

START

21 — Obtain user classification item

22 — Obtain question

23 — Translate question

24 — Convert question into question vector

25 — Search vector database

26 — Obtain specified number of document vectors

27 — Generate prompt

28 — Input prompt to LLM

29 — Obtain completion

30 — Generate answer

31 — Output answer

END

INFORMATION PROCESSING SYSTEM AND METHOD FOR PROCESSING INFORMATION

BACKGROUND

1. Field

The following description relates to an information processing system and a method for processing information.

2. Description of Related Art

Question answering systems use a large language model (LLM), which is one type of generative artificial intelligence (AI) tailored to perform natural language processing (NLP). A typical large language model generates and outputs text referred to as a "completion" in response to an input of an instruction referred to as a "prompt".

Generative AI using a large language model often outputs inaccurate answers to questions. Accordingly, Japanese Patent No. 7313757 discloses an example of a technique that generates prompts that are better suited for large language models by adding referential information to questions.

In order to optimize prompts, it is necessary to add more appropriate information to questions. Thus, when using a versatile large language model, there is a need for a method allowing the selection of information that is added to prompts so that the obtained answers will be more accurate.

It is an objective of the present disclosure to provide an information processing system and a method for processing information that allow a versatile large language model to output a more accurate answer.

SUMMARY

This Summary is provided to introduce a selection of concepts in a simplified form that are further described below in the Detailed Description. This Summary is not intended to identify key characteristics or essential characteristics of the claimed subject matter, nor is it intended to be used as an aid in determining the scope of the claimed subject matter.

In one general aspect, an information processing system is configured to output an answer generated using a large language model in response to a question input by any one of users. The information processing system includes at least one memory configured to store a program, and at least one processor configured to run the program to execute a process. The at least one processor is configured to obtain content included in electronic documents. The content includes category content assigned with any of content classification items based on content classification. The at least one processor is configured to convert the content into document vectors each assigned with the any of content classification items of the content prior to the conversion. The at least one processor is configured to obtain a user classification item related to the question. The user classification item is any of user classification items based on user classification. The user classification corresponds to the content classification. The at least one processor is configured to convert the question into a question vector. The at least one processor is configured to search the document vectors assigned with the content classification item that corresponds to the user classification item related to the question vector for a specified number of the document vectors having a high degree of relevance to the question vector. The at least one processor is configured to generate a prompt for input to the large language model. The prompt includes the content of the specified number of the document vectors prior to the conversion, serving as context, and the question. The at least one processor is configured to input the prompt to the large language model. The at least one processor is configured to output the answer generated based on text output by the large language model.

In another general aspect, an information processing system is configured to output an answer generated using a large language model and a vector database in response to a question input by any one of users. The vector database is configured to store document vectors converted from content assigned with any of content classification items based on content classification. The information processing system includes at least one memory configured to store a program, and at least one processor configured to run the program to execute a process. The at least one processor is configured to obtain a user classification item related to the question. The user classification item is any of user classification items based on user classification. The user classification corresponds to the content classification. The at least one processor is configured to convert the question into a question vector. The at least one processor is configured to search the document vectors assigned with the content classification item that corresponds to the user classification item related to the question vector for a specified number of the document vectors having a high degree of relevance to the question vector. The at least one processor is configured to generate a prompt for input to the large language model. The prompt includes the content of the specified number of the document vectors prior to the conversion, serving as context, and the question. The at least one processor is configured to input the prompt to the large language model. The at least one processor is configured to output the answer generated based on text output by the large language model.

In another general aspect, a method is for processing information. The method outputs an answer generated using a large language model in response to a question input by any one of users. The method includes obtaining, with one or more computers, content included in electronic documents, the content including category content assigned with any of content classification items based on content classification; converting, with the one or more computers, the content into document vectors each assigned with the any of content classification items of the content prior to the conversion; obtaining, with the one or more computers, a user classification item related to the question, the user classification item being any of user classification items based on user classification, the user classification corresponding to the content classification; converting, with the one or more computers, the question into a question vector; searching, with the one or more computers, the document vectors assigned with the content classification item that corresponds to the user classification item related to the question vector for a specified number of the document vectors having a high degree of relevance to the question vector; generating, with the one or more computers, a prompt for input to the large language model, the prompt including the content of the specified number of the document vectors prior to the conversion, serving as context, and the question; inputting, with the one or more computers, the prompt to the large language model; and outputting, with the one or more computers, the answer generated based on text output by the large language model.

Other features and aspects will be apparent from the following detailed description, the drawings, and the claims.

BRIEF DESCRIPTION OF THE DRAWINGS

FIG. 1 is a schematic diagram of an information processing system in accordance with an embodiment.

FIG. 2 is a diagram showing an example of correspondences between user classification and content classification.

FIG. 3 is a diagram illustrating the configuration of first and second information processing devices included in the information processing system shown in FIG. 1.

FIG. 5 is a diagram showing a method performed by the information processing system shown in FIG. 1 to output an answer.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 4:
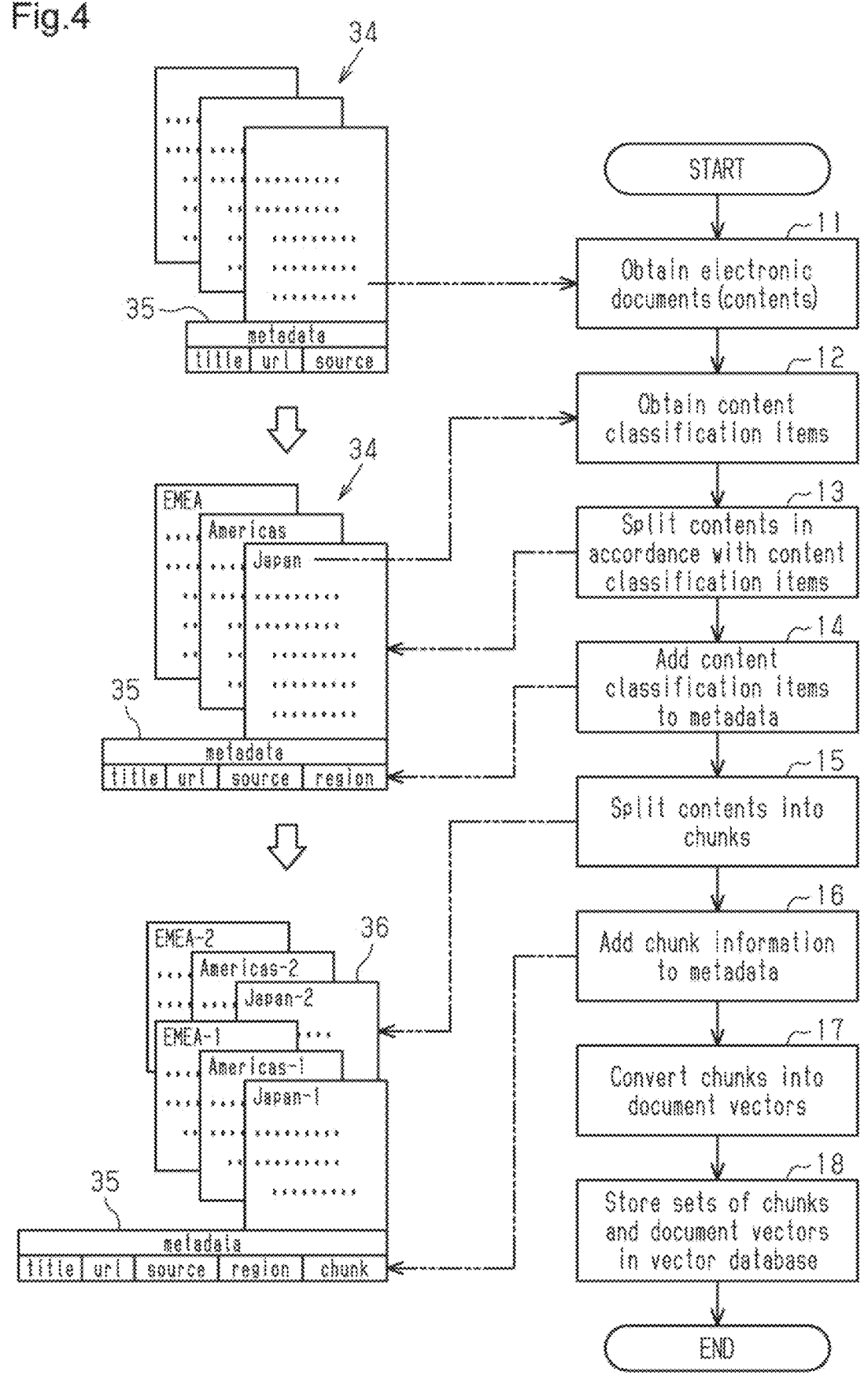
FIG. 4 is a diagram illustrating a method performed by the information processing system shown in FIG. 1 to construct a vector database.

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

Figure 1:
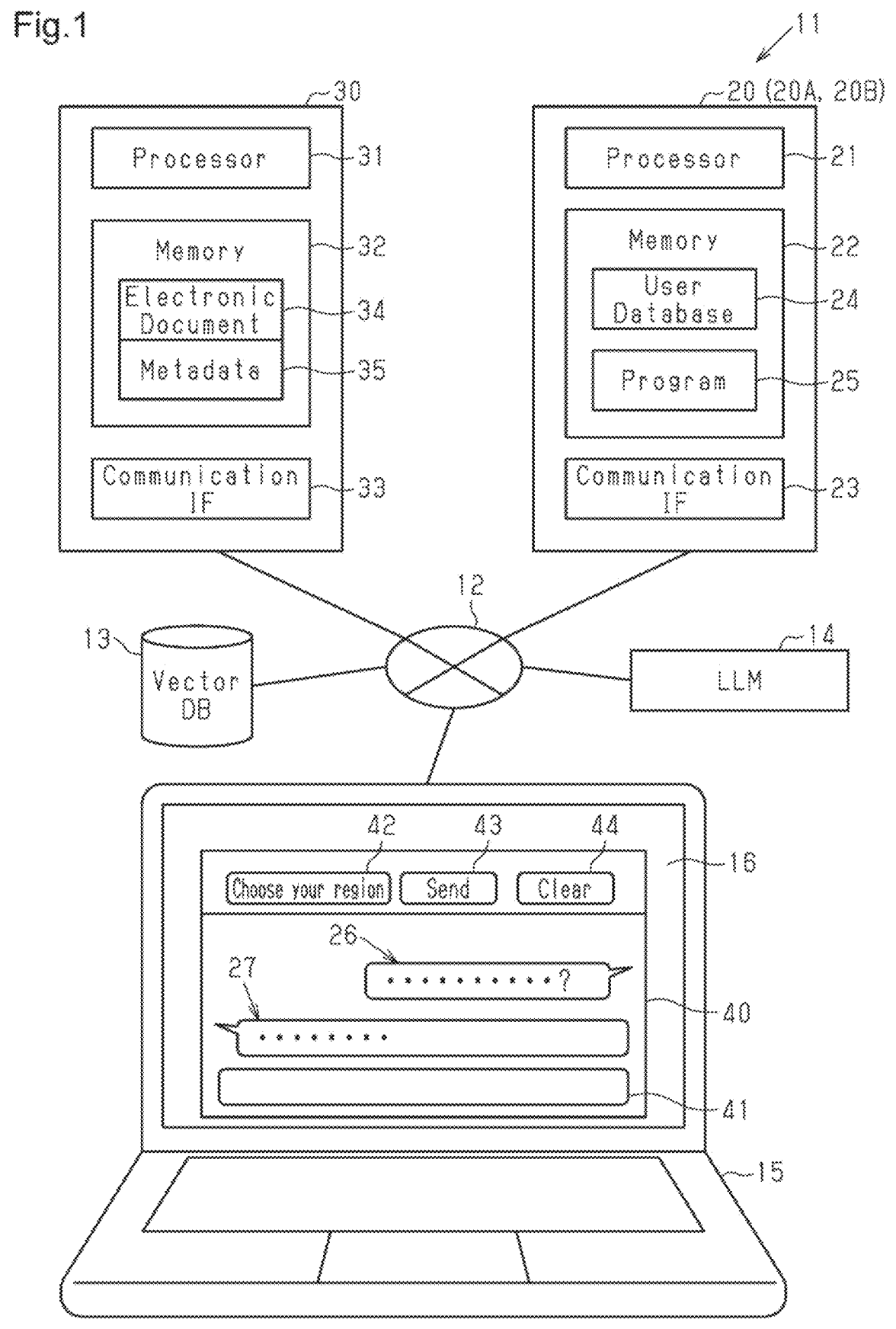

Examples of an information processing system 11, a method for processing information, and a program in accordance with the present disclosure will now be described with reference to FIGS. 1 to 5. The present invention is not limited to the illustrated examples and is intended to be defined by the claims and their equivalents, and all variations within the scope of the claims and their equivalents. Overall Configuration of Information Processing System As shown in FIG. 1, the information processing system 11 includes one or more information processing devices 20. In the example described hereafter, the information processing system 11 includes two information processing devices 20 (first information processing device 20A and second information processing device 20B).

The information processing devices 20A and 20B may each be, for example, formed by a computer that includes one or more processors 21, one or more memory 22, and a communication interface (IF) 23. The information processing devices 20 may be identical, similar, or different in configuration.

The one or more memory 22 store programs and data used for various types of functions. The programs include applications and operating systems. The one or more processors 21 perform the various types of functions by executing processes in accordance with the programs. The communication interface 23 allows for communication with other devices via a network 12. The network 12 includes, for example, the Internet, a wide area network (WAN), local area network (LAN), provider terminal, wireless communication network, radio base station, leased line, or the like.

The one or more information processing devices 20 may be configured to perform communication with one or more web servers 30 via the network 12. Each web server 30 may be formed by a computer that includes one or more processors 31, one or more memory 32, and a communication interface (IF) 33. The communication interface 33 allows for communication with other devices via the network 12.

Each of the processors 21 and 31 is, for example, a central processing unit (CPU), graphics processing unit (GPU), micro-processing unit (MPU), field-programmable gate array (FPGA), or other arithmetic logic unit. The processors 21 and 31 are, for example, processing circuitry configured to execute various types of software processing. The processing circuitry may include a dedicated hardware circuit (such as application-specific integrated circuit, ASIC) that executes at least part of the software processing. In other words, the software processing may be executed by the processing circuitry including at least one of a set of one or more software processing circuits and a set of one or more dedicated hardware circuits.

The memory 22 and 32 may include, for example, a random-access memory (RAM) or other type of a volatile memory. The memory 22 and 32 may be configured to temporarily store programs and data. The memory 22 and 32 may include storage that permanently stores data including programs. The storage may be, for example, a read-only memory (ROM), hard disk drive, flash memory, or other type of a non-volatile memory. The storage may be an attachable and detachable memory device, such as a memory card. The communication interfaces 23 and 33 may be, for example, used for LAN or other type of wired communication.

The web server 30 is, for example, configured to provide an internal website of a company that has branches or business establishments across countries and regions. The memory 32 of the web server 30 stores electronic documents 34.

The information processing system 11 may include a vector database 13. The vector database 13 may be held in a server device (not shown). Instead, the information processing device 20A, 20B may use data in the vector database 13 provided outside the information processing system 11 through the network 12. Alternatively, the information processing device 20A, 20B may include the vector database 13.

The information processing system 11 may include a large language model 14. Instead, the second information processing device 20B may use the large language model 14 provided outside the information processing system 11 through the network 12. The large language model 14 is a natural language processing model trained on a large amount of text data. The large language model 14 is a versatile language model that can be adapted to perform various types of natural language processing tasks, such as information extraction, text summarization, text generation, and question answering.

Upon receipt of a prompt 45 (refer to FIG. 3) including an instruction, the large language model 14 is configured to generate text in correspondence with the instruction, and output the text as a completion 46 (refer to FIG. 3). In the present example, the second information processing device 20B generates the prompt 45 and inputs the prompt 45 to the large language model 14. Subsequently, the second information processing device 20B edits the completion 46 of the large language model 14, if necessary, and outputs the completion 46.

Electronic Document and Content Classification

The electronic documents 34 are, for example, HTML, PDF, and plain text files containing content created for internal viewing. However, the file formats of the electronic documents 34 are not limited to these examples. Each electronic document 34 is provided with metadata 35 related to the electronic document 34. The metadata 35 may include, for example, information such as a title of the content and a uniform resource locator (URL). Further, the metadata 35 may include information such as a reference number (source) used for in-house management purposes (refer to FIG. 4).

Each electronic document 34 includes content mainly formed by sequences of characters. Such content is prepared to provide information to users, who are employees. The content viewed by the employees includes, but is not limited to, various company rules, instruction manuals for company facilities, and related questions and answers (Q&A).

The content may include category content assigned with any of content classification items based on content classification. The content classification divides the content into content groups in accordance with type of the content. Each content group is represented by a content classification item. The content classification item may be indicated as a title within the content of the electronic document 34. Alternatively, the content classification item may be commented out within a source code, such as HTML.

As shown in FIG. 2, the content classification items may include content category items and a common content item. The content category items correspond to the different types of the category content, respectively. The common content item corresponds to content that is common to all types of the content. When some portions of the content are assigned with any one of the content category items, the other portion of the content may be classified into the common content item. The content assigned with any one of the content category items is for set subject users, and the content assigned with the common content item is for all users.

User Classification

Some or all of the employees (users) are classified based on user classification that corresponds to the content classification. The user classification divides the users into user groups in accordance with types of the users. Each user group is represented by a user classification item. The user classification may classify the employees in accordance with types of the employees. For example, the types of the employees may be specified in accordance with at least one of assigned department, work type, work location, and job title.

As shown in FIG. 1, the memory 22 of the information processing device 20 may store a user database 24 that includes employee information (e.g., name and/or staff ID) and type information of each employee. The type information may include, but is not limited to, information that serves as the user classification item, such as assigned department, work type, work location, or job title.

As shown in FIG. 2, the user classification items may include user category items and an all user item. The user category items correspond to different user types, respectively. The all user item represents a user group that corresponds to all users, and the users may be classified into the all user item and the user category item in an overlapping manner. The users having undetermined or unknown types may be classified into the all user item. The same user may be classified into multiple user category items in an overlapping manner. Alternatively, the users may be classified so that each user is classified into only one user category item in a selective manner. The user category items may be the same as or different from the content category items. For example, the user category items may be greater or less than the content category items in number.

The user classification may classify the employees (users), for example, in accordance with countries or regions to which the employees (users) belong. For example, the user classification items may include the user category items that respectively correspond to countries or regions, and the all user item that includes all of the countries or regions.

The term "region" in the present disclosure may refer to a region that includes different countries, such as Europe, or each one of multiple regions in a single country. The "region" does not have to be a region demarcated by official boundaries, such as a country, prefecture, or city, and may be set in accordance with the content or the users.

In this case, the content classification items may include the content category items that respectively correspond to the countries or regions, and the common content item that is common to all of the countries and regions. The content assigned with any one of the content category items is specific to the corresponding country or region. The content assigned with the common content item is common to all countries and regions.

When the content classification classifies the content in accordance with "region", for example, the content category items may include "Japan", "Asia", "Americas (North, South, and Central Americas)", and "EMEA (Europe, Middle East and Africa)". In this case, the common content item may be "All region". In correspondence with the content classification, the user classification may also classify the users in accordance with "region" such that the user category items may include "Japan", "Asia", "Americas", and "EMEA" in the same manner as the content category items.

In this case, the users classified under "Japan" may also be classified under "Asia" in an overlapping manner. Alternatively, Asian users other than those classified under "Japan" may be classified under "Asia" in a selective manner. Further, the all user item may be "Global". The user classification and the content classification may include items having different names and substantially the same meaning, such as "Global" and "All region".

In addition to "region", the users and the content may be further classified in accordance with at least one of assigned department, work type, work location, and job title of the employee. Instead of or in addition to the above, "EMEA" of the user classification and/or the content classification may be further classified into "Europe", "Middle East", and "Africa". In this manner, the content classification items and the user classification items may have "one to two or more correspondence relationship" or "two or more to one correspondence relationship".

First Information Processing Device

As shown in FIG. 3, when the processor 21 runs a program 25 and executes processes, the first information processing device 20A acts as a device that includes functional units 51 to 55. The functional units 51 to 55 may be program code. The first information processing device 20A including the functional units 51 to 55 acts as a device that constructs the vector database 13.

The functional unit 51 is a content acquisition unit 51. The content acquisition unit 51 is configured to obtain the electronic documents 34 from the memory 32 of the web server 30. Each of the electronic documents 34 includes content. Also, each of the electronic documents 34 is provided with the metadata 35.

The functional unit 52 is a metadata management unit 52. The metadata management unit 52 is configured to edit the metadata 35 attached to the electronic document 34. For example, the metadata management unit 52 may add new data to the metadata 35. Further, when another piece of data is generated from the electronic document 34, the metadata management unit 52 may attach the metadata 35 of the original electronic document 34 to the generated data.

The functional unit 53 is a content splitter 53. The content splitter 53 is configured to split the content obtained by the content acquisition unit 51 into appropriate sections or lengths. In this case, the content splitter 53 may create multiple electronic documents respectively including pieces of the split content in a unified format.

The functional unit 54 is a vector converter 54. The vector converter 54 is configured to convert the content split into appropriate lengths into vectors. Such conversion is also referred to as embedding. The vectors are numerical representations of concepts that enable a computer to comprehend the relationships between the concepts. In the present disclosure, a vector obtained through embedding of the content is referred to as "document vector".

The functional unit 55 is a data management unit 55. The data management unit 55 is configured to store the document vectors in the vector database 13 and update the document vectors stored in the vector database 13.

Second Information Processing Device

When the processor 21 runs the program 25 and executes processes, the second information processing device 20B acts as a device that includes functional units 61 to 68. The second information processing device 20B including functional units 61 to 68 provides a chatbot configured to respond to user inquiries. The functional units 61 to 68 may be program codes for the chatbot.

As shown in FIG. 1, the chatbot is configured to output an answer 27 generated using the large language model 14 in response to a question 26 input by any one of the users. The chatbot is configured to show a chat window 40 on a display 16 of a terminal 15.

The user of the chatbot communicates with the second information processing device 20B through the terminal 15. The terminal 15 is, for example, a personal computer, a tablet, or a smartphone. The terminal 15 may be used or owned by an individual user or shared by a plurality of users.

As shown in FIG. 3, the functional unit 61 is a user classification acquisition unit 61. The user classification acquisition unit 61 is configured to obtain the user classification item related to the question 26 or the user who sent the question 26. The functional unit 62 is a question acquisition unit 62. The question acquisition unit 62 is configured to obtain the question 26 sent through the chat window 40.

The functional unit 63 is a vector converter 63. The vector converter 63 is configured to convert the question 26 into a vector (embedding). In the present disclosure, a vector obtained through embedding of the question 26 is referred to as "question vector".

The functional unit 64 is a vector search unit 64. The vector search unit 64 is configured to search the vector database 13 for document vectors having a high degree of relevance to the question vector. Such a search corresponds to a semantic search. The vector search unit 64 is configured to filter the document vectors subject to the search using the user classification item and the content classification item. Then, the vector search unit 64 is configured to extract document vectors having a high degree of relevance to the question vector from the document vectors assigned with the content classification item.

As an example, when the question vector is assigned with the all user item ("Global"), the document vectors assigned with any one of the content category items ("Japan", "Asia", "Americas", and "EMEA") and the document vectors assigned with the common content item ("All region") are the subjects searched. Then, the vector search unit 64 extracts a specified number of document vectors having a high degree of relevance to the question vector from the document vectors assigned with "Japan", "Asia", "Americas", "EMEA", or "All region".

As another example, when the question vector is assigned with one of the user category items (for example, "Japan"), the document vectors assigned with the common content item ("All region") and the document vectors assigned with one of the content category items ("Japan") that corresponds to the one of the user category items ("Japan") are the subjects searched. In this case, the document vectors assigned with any one of the remaining content category items ("Asia", "Americas", and "EMEA"), other than the one of the user category items ("Japan"), are excluded from the subjects searched. Then, the vector search unit 64 extracts a specified number of documents vector having a high degree of relevance to the question vector from the document vectors assigned with "Japan" or "All region".

The number (specified number) of obtained document vectors may be set in accordance with a token length of a chunk 36 and a length limit of the prompt 45 input to the large language model 14. The specified number may be, for example, more than one (for example, two, three, five, or ten). Alternatively, the specified number may be changed in accordance with the user category item assigned to the question vector.

The functional unit 65 is a prompt generation unit 65. The prompt generation unit 65 is configured to generate the prompt 45 for input to the large language model 14. The functional unit 66 is a prompt input unit 66. The prompt input unit 66 is configured to input the prompt 45 to the large language model 14.

The functional unit 67 is an answer acquisition unit 67. The answer acquisition unit 67 is configured to obtain the completion 46 output by the large language model 14 as an answer. The functional unit 68 is an answer output unit 68. The answer output unit 68 is configured to generate the answer 27 by editing or adding information to the completion 46, if necessary. Then, the answer output unit 68 outputs the generated answer 27 to the chat window 40.

Inquiry Responding Chatbot

As shown in FIG. 1, the chat window 40 has an entry field 41 where the question 26 is input. The chat window 40 may include a category button 42, a send button 43, and a clear button 44. The category button 42 is operated to input the type of the question 26. The send button 43 is operated to send the question 26 input to the entry field 41 to the information processing device 20. The clear button 44 is operated to clear the input or shown content.

The category button 42 may be of a selective type. The types of the question 26 may match the user classification items. For example, when the user classification items include "Japan", "Asia", "Americas", "EMEA", and "Global", the category button 42 may include the same options. The user may select a type for the question 26 that differs from that associated with the user. For example, in a case in which a user, who is presently in Japan, is assigned to a position in the United States, the user may need information related to the United States while being located in Japan.

The category button 42 may allow a user to select the assigned department, work type, job title, or name. Alternatively, the category button 42 may include an entry field that allows a user to freely input the type of the user or the type of the question 26 to the chat window 40. In this case, based on the selection or the input, the information processing device 20 may obtain corresponding type information from the user database 24 as the user classification item.

Alternatively, the user classification acquisition unit 61 may automatically obtain a user classification item that corresponds to the type information stored in the user database 24 based on the employee information (user information), such as an ID of the terminal 15 or a login ID for the terminal 15. In this case, instead of or in addition to obtaining the type information whenever a question is input, the user classification acquisition unit 61 may obtain the type information of the user, serving as the type of the question 26, each time the user logs in to the terminal 15 or each time the user activates the chatbot. For example, the user classification acquisition unit 61 may obtain the type information from the user database 24 when the user logs in to the terminal 15, and assign a user classification item that corresponds to the type information to the question 26 if the category button 42 is not operated. If the category button 42 is operated, the user classification acquisition unit 61 may assign the selected user classification item to the question 26.

The chatbot may be configured to answer inquiries from the users (for example, employees) regarding the content of the electronic documents 34 provided by the web server 30. Specifically, the chatbot may be configured to generate the answer 27 in response to the question 26 of a user based on a specific electronic document 34 using a text analyzing function and a text creating function of the large language model 14.

It is undesirable to use, for example, confidential documents that should not be publicly disclosed as training data for the large language model 14 provided by an external organization. Thus, the information processing system 11 constructs the vector database 13 dedicated for the internal company documents, and generates the answer 27 based on the content of the electronic document 34 without having the large language model 14 learn the internal company documents.

Method for Generating Vector Database

A method for constructing the vector database 13 performed by the first information processing device 20A will now be described with reference to FIG. 4 using an example in which the content classification and the user classification are specified in accordance with "region".

In step S11, the content acquisition unit 51 obtains the electronic documents 34 from the memory 32 of the web server 30. The metadata 35 is attached to each electronic document 34. Since each of the electronic documents 34 includes content, the content is obtained in step S11.

In step S12, the content acquisition unit 51 obtains the content classification item ("Japan", "Asia", "Americas", "EMEA" or "All region") of each of the obtained electronic documents 34 or each piece of the content. Each electronic document 34 may be assigned with a single content classification item. Alternatively, a single electronic document 34 may include multiple pieces of the content assigned with different content classification items.

In step S13, when a single electronic document 34 includes multiple pieces of the content assigned with different content classification items, the content splitter 53 splits the multiple pieces of the content in accordance with the content classification items. In step S14, the metadata management unit 52 adds the content classification item to the metadata 35 of the corresponding electronic document 34 as regional information.

In step S15, the content splitter 53 splits each piece of the content assigned with the content classification item into data sets, each having a specified amount (token lengths). Each data set of the split content is referred to as the chunk 36. In this case, the content may be split such that each chunk 36 has an appropriate token length (for example, approximately 2000 characters). The metadata management unit 52 attaches the metadata 35 of the content prior to the splitting to the chunks 36. In step S16, the metadata management unit 52 adds chunk information to the metadata 35 of the chunks 36.

In step S17, the vector converter 54 converts the content of the chunks 36 into document vectors. The metadata management unit 52 attaches the metadata 35 of the content (chunks 36) prior to the conversion to corresponding document vectors. In this manner, each document vector is assigned with the corresponding content classification item.

In step S18, the data management unit 55 stores each chunk 36 (content prior to conversion) and a corresponding document vector as a set in the vector database 13, and then ends the process. This constructs the vector database 13 that stores the document vectors assigned with the content classification items.

A separate history database (not shown) may manage the document vectors stored in the vector database 13 together with data related to the vectorization, such as an acquisition date of the metadata 35 and the electronic documents 34. When the electronic documents 34, which are the original data of the document vectors, or the content of the electronic documents 34 are updated in the web server 30, the data management unit 55 may update only the updated portion of the document vectors in the vector database 13 based on the history database.

Method for Outputting Answer

A method for outputting the answer 27 performed by the second information processing device 20B will now be described with reference to FIG. 5.

When a user operates the send button 43 in a state in which the question 26 is input to the entry field 41, the user classification acquisition unit 61 obtains the user classification item related to the question 26 in step S21. The user classification acquisition unit 61 may obtain the user classification item from the information selected by the user with the category button 42. Alternatively, the user classification item may be obtained by another process. For example, the user classification acquisition unit 61 may obtain the employee information related to the user (employee), and then refers to the user database 24 to acquire the user classification item that corresponds to the type information of the employee, which corresponds to the obtained employee information.

In step S22, the question acquisition unit 62 obtains the question 26 input to the entry field 41. The question acquisition unit 62 may assign the user classification item obtained in step S21 to the question 26 obtained in step S22. Step S22 may be executed before step S21 or at the same time as step S21.

In step S23, the question acquisition unit 62 or another functional unit (translation unit, not shown) may translate the question 26 input in a first language into a second language. For example, when the language mainly used in the training data of the large language model 14 is the second language (for example, English), the completion 46 will have a higher degree of generation accuracy if the prompt 45 is written in the second language. Therefore, when the question 26 is written in a language other than the second language, which is the training language of the large language model 14, it is preferred that the question 26 be machine translated into the second language.

In step S24, the vector converter 63 converts the question 26 into a question vector. When a main part of the content (electronic documents 34) prior to the vectorization is written in the first language, the question 26 written in the first language may be vectorized in step S24. Alternatively, when the main part of content prior to the vectorization is written in the second language, the question 26 may be translated into the second language and then vectorized in step S24. In other words, it is preferred that the question vector and the document vectors used for a search be vectorized from a sequence of characters written in the same language.

In step S25, the vector search unit 64 searches the vector database 13 in accordance with the question vector generated in step S24 and the user classification item obtained in step S21. The search is conducted under a condition in which the searched subjects include the document vectors assigned with the content classification item that corresponds to the user classification item.

In step S26, as a result of the search, the vector converter 63 obtains a specified number of document vectors having a high degree of relevance to the question vector (for example, top ten chunks 36 of search result) from the document vectors. The content of the obtained document vectors prior to the vectorization serves as an information source (also referred to as context) for the answer 27.

In step S27, the prompt generation unit 65 uses the content (information source) of the document vectors prior to the vectorization obtained in step S26 and the question 26 to generate the prompt 45 for input to the large language model 14. In this case, a template of the prompt 45 may be prepared in advance. Regardless of whether the template is used, the prompt 45 is configured to include the content of the specified number of document vectors prior to the vectorization, serving as context, and the question 26.

The prompt 45 may be written in the second language to increase the generation accuracy of the completion 46. In this case, the prompt 45 may include the question 26 translated into the second language in step S23. Further, when the content serving as the context is written in the first language, the content may be machine-translated into the second language and then included in the prompt 45.

The template is, for example, an instruction sentence such as "Please generate an answer to the question using the following context". The prompt 45 may be completed when the question 26 is inserted into the "question" portion and the content serving as the information source is inserted into the "context" portion. The prompt 45 (template) may include, for example, an instruction to output a link (URL) to the electronic document 34, which is the source of the content used in the answer 27. Further, the prompt 45 may include, for example, an instruction specifying an output format, such as the number of characters or the language of the output text.

In step S28, the prompt input unit 66 inputs the generated prompt 45 to the large language model 14. Subsequently, the large language model 14 outputs the completion 46 using the question 26 and the content serving as the information source as the context.

In step S29, the answer acquisition unit 67 obtains the completion 46 (answer) output by the large language model 14. When the question 26 has been translated in step S23, the answer output unit 68 or another functional unit (translation unit, not shown) may translate the completion 46 written in the second language into the first language to generate the answer 27 in step S30.

The prompt 45 may include an instruction to output the answer in the first language such that the large language model 14 translates the completion 46 into the first language. In this case, the answer acquisition unit 67 obtains the completion 46 written in the first language in step S29 so that the completion 46 does not have to be translated into the first language in step S30. The answer output unit 68 may directly output the completion 46 as the answer 27. Alternatively, the answer output unit 68 may edit or add information (for example, answer date and time) to the completion 46 to generate the answer 27. In step S31, the answer output unit 68 outputs the generated answer 27 to the chat window 40, and then ends the process.

The user may check the answer 27 output to the chat window 40 and subsequently send the next question 26. In this case, the second information processing device 20B repeats steps S21 to S31. In a case in which questions and answers are continuously repeated as described above, the second information processor 20B may generate the answer 27 taking into consideration preceding questions 26, the user classification items assigned to the preceding questions 26, and preceding answers 27. For example, the prompt generation unit 65 may add chat history to the prompt 45 in step S27 in addition to the question 26 and the content serving as the information source.

Operation of the Present Disclosure

Construction of high-performance large language models requires a massive amount of training data, advanced computers for learning the data, a long processing time, and an enormous amount of preparation costs. Thus, it is impractical for general individuals or companies to develop large language models, and those individuals and companies often use large language models provided as open source.

If a large language model is trained with training data of a particular field, the accuracy of the outputs related to the field will be increased. However, general users cannot select the training data for open-source large language models. Further, internal company documents should not be publicly disclosed in general and are thus inappropriate for the training data of an open-source large language model used by unspecified users.

A prompt may be input to the large language model as an instruction including all the relevant content of the internal company documents to obtain an answer based on the instruction. However, there is a limitation imposed on the length of a token that can be input as a prompt. Thus, the content cannot all be included in the prompt.

Accordingly, the information processing system 11 of the present disclosure is configured to include part of the content obtained from the electronic documents 34 in the prompt 45 as context and have the large language model 14 output the completion 46 in response to the question 26. In this manner, the lack of knowledge of the large language model 14 is supplemented by the content necessary for an answer. This allows the large language model 14 to generate a more accurate answer 27 using a versatile text creating function.

An example assumes that a company having employees in multiple countries publishes manuals related to company facilities (for example, electronic devices such as printers) or administrative procedures, such as attendance application, on an internal website as the electronic documents 34. Such manuals may vary between countries depending on the content. Also, the manuals may be rarely needed or irregularly updated. Thus, it is a burden for general users to check all the electronic documents 34.

Accordingly, the information processing system 11 provides the chatbot as artificial intelligence having full knowledge of the content of the electronic documents 34 and answers questions from the users. This reduces the burden on the users (employees). However, the specifications of devices such as printers may slightly vary between countries, and it is difficult for machine learning models to learn such subtle differences.

Thus, the information processing system 11 classifies the content of the electronic documents 34 by type in advance, and assigns classification information (content classification item) to the content as the metadata 35. The content including the classification information is divided into the chunks 36 and vectorized into the document vectors so that the content becomes subject to the semantic search in accordance with the meaning of search text (question 26).

Further, classification information (user classification item) that corresponds to the content classification item is assigned to the question 26 so that the relevant content is searched more accurately. In other words, the document vectors serving as the searched subjects are filtered by the user classification item and the content classification item. This enables the large language model 14 to determine subtle differences of the content based on the metadata 35.

When the content corresponds to a manual on how to set up a printer, for example, whether the manual is for "United States" or "Japan" may be indicated in the file name, page name, or page title. However, the indication is usually not included within the content. Further, if the content is split into small pieces of chunks 36, most of the chunks 36 will not include area information, such as "United States" or "Japan". Thus, it is extremely difficult for the large language model 14 to determine the subject region from the content of each chunk 36. As a result, the large language model 14 may generate an inaccurate answer.

In this regard, the type of the content is attached to the document vector as the metadata 35 so that the content is filtered effectively. Specifically, the information processing system 11 selects the content assigned with the content classification item that corresponds to the user classification item of the question 26, and obtains the document vectors having a high degree of relevance to the question vector from the selected content. This avoids a situation in which the answer 27 includes different types of content.

The classification information of the question 26 is the user classification item based on the user classification. The content serving as the searched subject is narrowed more easily using the classification based on the type of the user who inputs the question 26 than the type of the question 26. In particular, when the electronic documents 34 are internal company materials, the employee information is easier to obtain than personal information of an unspecified number of users. Also, it is relatively easy to predict intended viewers (employees) for each type of the content. Thus, the content classification readily matches the user classification.

In this manner, the information processing system 11 associates the content classification information with the content serving as the information source for answer, and associates the user classification information with the question 26. This compensates for the inaccuracy of the completion 46.

*Advantages of the Present Disclosure*

The present disclosure has the following advantages.
(1) The user classification item is assigned to the question 26 so that the content (chunks 36) assigned with the content classification item that corresponds to the user classification item becomes the searched subject. The prompt 45 includes the content having a high degree of relevance to the question 26 so that the versatile large language model 14 outputs a more accurate answer 27.
(2) The content includes the common content for all users in addition to the category content for expected subject users. The common content item is assigned to such content common to all users so that searches are performed accurately.
(3) When the question vector is assigned with the all user item, the question 26 relates to the content common to all users. In this case, the document vectors assigned with any one of the content category items and the document vectors assigned with the common content item become the searched subjects. Thus, all of the content having a high degree of relevance to the question is searched.
(4) When the question vector is assigned with one of the user category items, the document vectors assigned with one of the content category items that corresponds to the one of the user category items, and the document vectors assigned with the common content item become the searched subjects. Thus, all of the content having a high degree of relevance to the question is searched. Further, the document vectors assigned with the content category items other than the one of the content category items are excluded from the searched subjects. This avoids a situation in which the answer 27 includes different types of content.
(5) When the users are employees, the information processing device 20 obtains the user classification item to be assigned to the question 26 from the user database 24. Thus, an employee does not have to perform an operation (for example, select category button 42) to input the user classification item each time the employee inputs the question 26. This minimizes unnecessary outputs resulting from operation errors (for example, selection error of category button 42).
(6) The content of the internal company documents (electronic documents 34) usually does not indicate the expected employees for each part of the content. Also, it is difficult for the employees to determine the correspondences. In this regard, each piece of the content is assigned with the content classification item in accordance with assigned department, work type, work location, and job title. Thus, the information processing system 11 outputs an accurate answer 27 that is in accordance with the assigned department, work type, work location, or job title of the user (employee) who sent the question 26.
(7) The series of processes performed by the chatbot include translation of the question 26 and the answer 27. Thus, the large language model 14 and the information processing device 20 can accurately execute processes in the second language. This also allows the user to ask questions and obtain answers in his/her first language.

(8) Products or services provided across countries or regions may have a common basic structure or content. However, the specifics may vary between the countries or regions. Therefore, the content classification and the user classification in accordance with regions are useful when providing information related to products or services offered in a wide range of regions.

(9) When the information processing device 20 obtains the user information of the user who operates the chatbot, the information processing device 20 obtains the user classification item to be assigned to the question 26 from the user database 24. Thus, the user does not have to perform an operation to input the user classification item each time the user inputs the question 26.

MODIFIED EXAMPLES

The present embodiment can be modified as described below. The present embodiment and the following modifications can be combined as long as the combined modifications remain technically consistent with each other.

First Modified Example

The functional units 51 to 55, and 61 to 68 may be implemented by a single information processing device 20 or three or more information processing devices 20. Further, steps S11 to S18 and S21 to 31 may be implemented by different functional units (program codes).

Second Modified Example

The information processing system 11 does not have to include the first information processing device 20A. In other words, the information processing system 11 does not have to construct the vector database 13 as described in steps S11 to S17. In this case, the information processing device 20 may be configured to use the vector database 13 constructed in advance to generate the answer 27. Such a vector database 13 may be included in the information processing system 11 or separated from the information processing system 11.

Third Modified Example

In the present disclosure, the type information of the content is included in the metadata 35. However, as long as the type information is associated with the chunks and the document vectors, the type information may have any data format and may be added in any manner. For example, the type information may be added as an index. Alternatively, the document vectors and pieces of the type information may be numbered and associated with each other using a separate database or the like.

Fourth Modified Example

When the electronic documents 34 are confidential documents, the content classification may classify the confidential documents in accordance with confidentiality ranks, such as "internal use only", "secret", and "top secret". In this case, it is preferred that the user classification classify the confidential documents in accordance with subject users (employees) who are allowed to view the confidential documents. Further, in step S30, the answer acquisition unit 67 may generate the answer 27 by adding the confidentiality level of the output information or precautions for handling the information to the completion 46.

Fifth Modified Example

The electronic documents 34 are not limited to confidential documents such as internal company documents and may include, for example, content provided for registered users of various types of services such as E-Commerce sites, electronic payments, point services, or the like. For example, when the content corresponds to a manual related to various services, the service provider can obtain user information (for example, user ID) of a registered user from login information to service sites or applications for providing the services. In this case, the information processing device 20 refers to the user database 24 to obtain the user classification item that corresponds to the acquired user information. The user classification item may be, for example, a membership rank or a membership type of the user.

Sixth Modified Example

The electronic documents 34 may include content related to services provided by a store with multiple branches. The names of the branches may be used as the classification items for the user classification and the content classification if the business hours or offered products or services differ between the branches. In this case, the terminal 15 is not limited to a device owned by an individual user, and may be a terminal distributed to each store.

Seventh Modified Example

When the electronic documents 34 include content related to products or services having different versions, the content classification may classify the products or services in accordance with the versions. In this case, the user classification may also classify the users in accordance with expected users for each version. For example, the version of the products or services related to a question may be selected with the category button 42. In this manner, the user classification may match the content classification, and the user classification items may completely match the content classification items. In this case, the terms "user classification" and "user classification items" can be replaced with "content classification" and "content classification items", respectively.

Eighth Modified Example

As described in the seventh modified example, the question 26 may be classified by the question classification or the content classification instead of the user type. In this case, the terms "user classification" and the "user classification items" in the present disclosure may be replaced with "query classification" and "query classification items", respectively.

Ninth Modified Example

The user classification item related to the question 26 may be obtained through a chat function in the chat window 40. For example, when the chat window 40 is activated, the chatbot may send a message inquiring about the user type (user classification item). Alternatively, the chatbot may send a message inquiring about the user type (user classification item) in response to the question 26. When different kinds of user classification are set (for example, in accordance with "region" and "work type"), the chatbot may send messages inquiring about the user type for each kind of user classification.

Tenth Modified Example

The electronic documents 34 may be stored in any device, such as a data server, memory, or storage, instead of the web server 30. Further, the information processing device 20 may obtain the electronic documents 34 by downloading HTML files published as websites. Alternatively, the information processing device 20 may obtain the electronic documents 34 via an attachable and detachable memory medium (for example, memory card or storage) without using the network 12.

Eleventh Modified Example

The information processing system 11 may be formed by one or more information processing devices 20 that implement various functions of the present disclosure using external vector database 13 and large language model 14.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

Configurations that can be understood from the above embodiment and modified examples will now be listed below.

(Aspect 1) An information processing system configured to output an answer generated using a large language model in response to a question input by any one of users, the information processing system including:

at least one memory configured to store a program; and at least one processor configured to run the program to execute a process, in which: the at least one processor is configured to obtain content included in electronic documents, the content including category content assigned with any of content classification items based on content classification;

the at least one processor is configured to convert the content into document vectors each assigned with the any of content classification items of the content prior to the conversion;

the at least one processor is configured to obtain a user classification item related to the question, the user classification item being any of user classification items based on user classification, the user classification corresponding to the content classification;

the at least one processor is configured to convert the question into a question vector;

the at least one processor is configured to search the document vectors assigned with the content classification item that corresponds to the user classification item related to the question vector for a specified number of the document vectors having a high degree of relevance to the question vector;

the at least one processor is configured to generate a prompt for input to the large language model, the prompt including the content of the specified number of the document vectors prior to the conversion, serving as context, and the question;

the at least one processor is configured to input the prompt to the large language model; and the at least one processor is configured to output the answer generated based on text output by the large language model.

(Aspect 2) The information processing system according to aspect 1, in which: the user classification is based on types of the users;

the user classification items include user category items that respectively correspond to the types of the users, and an all user item that corresponds to all of the types of the users;

the content classification is based on types of the content, and the types of the content are set in accordance with the types of the users;

the content classification items include content category items that respectively correspond to different types of the category content, and a common content item that corresponds to the content that is common to all of the types of the content, and the content assigned with any one of the content category items is, for the users, classified into a corresponding one of the user category items, and the content assigned with the common content item is for all of the types of the users.

(Aspect 3) The information processing system according to aspect 2, in which when the question vector is assigned with the all user item, all of the document vectors assigned with the content category items and the document vectors assigned with the common content item are subject to the search.

(Aspect 4) The information processing system according to aspect 2 or 3, in which when the question vector is assigned with one of the user category items, the document vectors assigned with the common content item and the document vectors assigned with one of the content category items that corresponds to the one of the user category items are subject to the search, and the document vectors assigned with the content category items other than the one of the content category items are excluded from the search.

(Aspect 5) The information processing system according to any one of aspects 1 to 4, in which:

the users are employees;

the user classification classifies the employees in accordance with types of the employees;

the at least one memory stores a user database including employee information of each of the employees and the user classification items; and the at least one processor is configured to obtain the employee information and acquire the user classification item that corresponds to the obtained employee information from the user database.

(Aspect 6) The information processing system according to aspect 5, in which the types of the employees are specified in accordance with at least one of assigned department, work type, work location, and job title.

(Aspect 7) The information processing system according to any one of aspects 1 to 6, in which the at least one processor is configured to translate the question input in a first language into a second language, and the at least one processor is configured to translate the text output by the large language model in the second language into the first language.

(Aspect 8) The information processing system according to any one of aspects 1 to 7, in which:

the user classification classifies the users in accordance with countries or regions to which the users belong;

the user classification items include user category items that respectively correspond to the countries or regions, and an all user item;

the content classification items include content category items that respectively correspond to the countries or regions, and a common content item; and the content assigned with the content category items is specific to a corresponding one of the countries or regions, and the content assigned with the common content item is common to all countries and regions.

(Aspect 9) The information processing system according to any one of aspects 1 to 8, in which:

the at least one memory stores a user database including user information of each of the users and the user classification items; and the at least one processor is configured to obtain the user information and acquire the user classification item that corresponds to the obtained user information from the user database.

(Aspect 10) A method for processing information that outputs an answer generated using a large language model in response to a question input by any one of users, the method including:

obtaining, with one or more computers, content included in electronic documents, the content including category content assigned with any of content classification items based on content classification;

converting, with the one or more computers, the content into document vectors each assigned with the any of content classification items of the content prior to the conversion;

obtaining, with the one or more computers, a user classification item related to the question, the user classification item being any of user classification items based on user classification, the user classification corresponding to the content classification;

converting, with the one or more computers, the question into a question vector;

searching, with the one or more computers, the document vectors assigned with the content classification item that corresponds to the user classification item related to the question vector for a specified number of the document vectors having a high degree of relevance to the question vector;

generating, with the one or more computers, a prompt for input to the large language model, the prompt including the content of the specified number of the document vectors prior to the conversion, serving as context, and the question;

inputting, with the one or more computers, the prompt to the large language model; and outputting, with the one or more computers, the answer generated based on text output by the large language model.

(Aspect 11) An information processing system configured to output an answer generated using a large language model and a vector database in response to a question input by any one of users, the vector database being configured to store document vectors converted from content assigned with any of content classification items based on content classification, the information processing system including:

at least one memory configured to store a program; and at least one processor configured to run the program to execute a process, in which:

the at least one processor is configured to obtain a user classification item related to the question, the user classification item being any of user classification items based on user classification, the user classification corresponding to the content classification;

the at least one processor is configured to convert the question into a question vector;

the at least one processor is configured to search the document vectors assigned with the content classification item that corresponds to the user classification item related to the question vector for a specified number of the document vectors having a high degree of relevance to the question vector;

the at least one processor is configured to generate a prompt for input to the large language model, the prompt including the content of the specified number of the document vectors prior to the conversion, serving as context, and the question;

the at least one processor is configured to input the prompt to the large language model; and the at least one processor is configured to output the answer generated based on text output by the large language model.

(Aspect 12) An information processing program configured to output an answer generated using a large language model and a vector database in response to a question input by any one of users, the vector database being configured to store document vectors converted from content assigned with any of content classification items based on content classification, in which:

the information processing program is configured to have a computer obtain a user classification item related to the question, the user classification item being any of user classification items based on user classification, the user classification corresponding to the content classification;

the information processing program is configured to have the computer convert the question into a question vector;

the information processing program is configured to have the computer search the document vectors assigned with the content classification item that corresponds to the user classification item related to the question vector for a specified number of the document vectors having a high degree of relevance to the question vector;

the information processing program is configured to have the computer generate a prompt for input to the large language model, the prompt including the content of the specified number of the document vectors prior to the conversion, serving as context, and the question;

the information processing program is configured to have the computer input the prompt to the large language model; and the information processing program is configured to have the computer output the answer generated based on text output by the large language model.

21

22

What is claimed is:

1. An information processing system configured to output an answer generated using a large language model in response to a question input by any one of users, the information processing system comprising:

at least one memory configured to store a program; and at least one processor configured to run the program to execute a process, wherein:

the at least one processor is configured to obtain content included in electronic documents, the content including category content based on types of users and common content that is for all of the types of the users;

the at least one processor is configured to convert the content into document vectors each assigned with the any of content classification items of the content prior to the conversion, the content classification items including content category items that respectively correspond to different types of the category content, and a common content item that corresponds to the common content;

the at least one processor is configured to obtain a user classification item related to the question, the user classification item including user category items that respectively correspond to different types of the users, and an all user item that corresponds to all of the types of the users;

the at least one processor is configured to convert the question into a question vector;

the at least one processor is configured to search the document vectors under specified search conditions, and obtain for a specified number of the document vectors based on a relevance to the question vector, the specified search conditions including (i) when the question vector is assigned with the all user item, all of the document vectors assigned with the content category items and the document vectors assigned with the common content item are determined as the search scope; and (ii) when the question vector is assigned with one of the user category items, only the document vectors assigned with the common content item and the document vectors assigned with one of the content category items that corresponds to the one of the user category items are determined as the search scope, while document vectors assigned with other content category items are excluded from the search scope;

the at least one processor is configured to generate a prompt for input to the large language model, the prompt including the content of the specified number of the document vectors prior to the conversion, serving as context, and the question;

the at least one processor is configured to input the prompt to the large language model; and the at least one processor is configured to output the answer generated based on text output by the large language model.

2. The information processing system according to claim 1, wherein:

the users are employees;

the user classification classifies the employees in accordance with types of the employees;

the at least one memory stores a user database including employee information of each of the employees and the user classification items; and the at least one processor is configured to obtain the employee information and acquire the user classification item that corresponds to the obtained employee information from the user database.

3. The information processing system according to claim 2, wherein the types of the employees are specified in accordance with at least one of assigned department, work type, work location, and job title.

4. The information processing system according to claim 1, wherein the at least one processor is configured to translate the question input in a first language into a second language, and the at least one processor is configured to translate the text output by the large language model in the second language into the first language.

5. The information processing system according to claim 1, wherein:

the user classification classifies the users in accordance with countries or regions to which the users belong;

the user classification items include user category items that respectively correspond to the countries or regions, and an all user item;

the content classification items include content category items that respectively correspond to the countries or regions, and a common content item; and the content assigned with the content category items is specific to a corresponding one of the countries or regions, and the content assigned with the common content item is common to all countries and regions.

6. The information processing system according to claim 1, wherein:

the at least one memory stores a user database including user information of each of the users and the user classification items; and the at least one processor is configured to obtain the user information and acquire the user classification item that corresponds to the obtained user information from the user database.

7. An information processing system configured to output an answer generated using a large language model and a vector database in response to a question input by any one of users, the vector database being configured to store document vectors converted from content based on types of users and common content that is for all of the types of the users, the information processing system comprising:

at least one memory configured to store a program; and at least one processor configured to run the program to execute a process, wherein:

the at least one processor is configured to obtain a user classification item related to the question, the user classification item including user category items that respectively correspond to different types of the users, and an all user item that corresponds to all of the types of the users;

the at least one processor is configured to convert the question into a question vector;

the at least one processor is configured to search the document vectors under specified search conditions, and obtain a specified number of the document vectors based on a relevance to the question vector, the specified search conditions including:

(i) when the question vector is assigned with the all user item, all of the document vectors assigned with the content category items and the document vectors assigned with the common content item are determined as the search scope; and (ii) when the question vector is assigned with one of the user category items, only the document vectors assigned with the common content item and the document vectors assigned with one of the content category items that corresponds to the one of the user category items are determined as the search scope, while document vectors assigned with other content category items are excluded from the search scope;

the at least one processor is configured to generate a prompt for input to the large language model, the prompt including the content of the specified number of the document vectors prior to the conversion, serving as context, and the question;

the at least one processor is configured to input the prompt to the large language model; and the at least one processor is configured to output the answer generated based on text output by the large language model.

8. A method for processing information that outputs an answer generated using a large language model in response to a question input by any one of users, the method comprising:

obtaining, with one or more computers, content included in electronic documents, the content including category content based on types of users and common content that is for all of the types of the users;

converting, with the one or more computers, the content into document vectors each assigned with the any of content classification items of the content prior to the conversion, the content classification items including content category items that respectively correspond to different types of the category content, and a common content item that corresponds to the common content;

obtaining, with the one or more computers, a user classification item related to the question, the user classification item including user category items that respectively correspond to different types of the users, and an all user item that corresponds to all of the types of the users;

converting, with the one or more computers, the question into a question vector;

searching, with the one or more computers, the document vectors under specified search conditions, and obtain a specified number of the document vectors based on relevance to the question vector, the specified search conditions including:

(i) when the question vector is assigned with the all user item, all of the document vectors assigned with the content category items and the document vectors assigned with the common content item are determined as the search scope; and (ii) when the question vector is assigned with one of the user category items, only the document vectors assigned with the common content item and the document vectors assigned with one of the content category items that corresponds to the one of the user category items are determined as the search scope, while document vectors assigned with other content category items are excluded from the search scope;

generating, with the one or more computers, a prompt for input to the large language model, the prompt including the content of the specified number of the document vectors prior to the conversion, serving as context, and the question;

inputting, with the one or more computers, the prompt to the large language model; and outputting, with the one or more computers, the answer generated based on text output by the large language model.

\* \* \* \* \*